June 11, 1929.  J. KONES  1,716,556

PIE PAN

Filed July 2, 1928

Inventor

Jennie Kones

By Clarence A. O'Brien
Attorney

Patented June 11, 1929.

1,716,556

UNITED STATES PATENT OFFICE.

JENNIE KONES, OF CASTLEWOOD, SOUTH DAKOTA.

PIE PAN.

Application filed July 2, 1928. Serial No. 289,754.

The present invention relates to new and useful improvements in domestic cooking utensils and has a more particular reference to a pie pan in which a pie of any variety desired may be cooked and cut conveniently into the customary triangular shaped pieces.

Pie pans are generally constructed in round or plate like shape, which requires considerable space, due to the particular shape, when placed within the usual cooking stove oven.

The prime object of this invention is to eliminate the use of round shaped pie pans, by the use of the present invention, in which the pan is of parallelogrammatic shape to permit the cooked pie to be cut conveniently into triangular shaped pieces, similar to the customary shape of pie slices.

Another object of importance resides in the provision of a pie pan, which will, in use, permit the utilization of all of the space in an ordinary oven when a plurality of pies are being cooked.

Still another object is to provide a pie pan which can be manufactured at a low cost and perhaps cheaper than the customary round pie pan now employed.

After the reading of the following specification and claims, other objects and advantages of the invention will become apparent.

Figure 1:
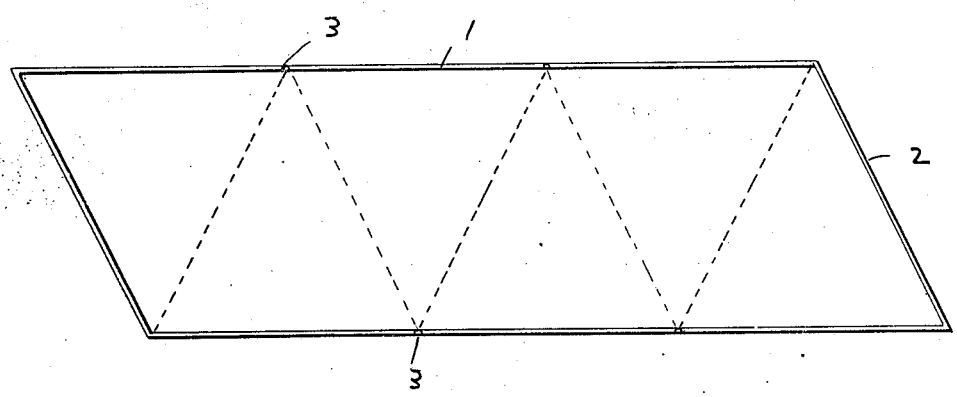
Figure 1 represents a top plan view of the improved pie pan.
Figure 2:
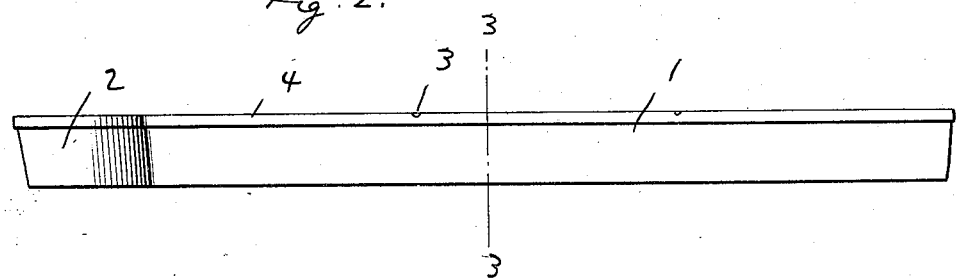
Figure 2 represents a side elevation of the pie pan.
Figure 3:
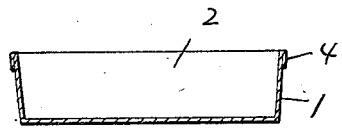
Figure 3 represents a cross sectional view therethrough and taken substantially on the lines 3—3 of Figure 2.

Referring now to the drawings, wherein like numerals designate like parts, it will be found that the improved pie pan consists in construction, of an open top pan provided with a slightly outwardly diverged side and end walls 1 and 2 respectively.

The pan is of parallelogrammatic shape of somewhat elongated extent. The end walls 2 of the pan are disposed obliquely with respect to the side walls 1 and in parallelism to each other.

At zig-zag points on the edge of the side walls 1, notches 3 are formed, for the purpose of guiding the knife in the operation of cutting the pie contained within the pan into triangular shaped pieces, such as is illustrated by dotted lines in Figure 1 of the drawings. It is preferable that the top edges of the side and end walls be rolled as at 4, for the purpose of strengthening the construction thereof. Obviously, the pans may be placed end to end and with their ends abutting, on the shelf of an oven, thus utilizing all of the space thereof, with the end in view that considerably more pies can be cooked during a single cooking period.

Having described the invention, what is claimed as new is:

1. In a cooking utensil of the character described, an open top pan of substantially narrow elongated extent, the side walls of said pan being of parallel disposition, while the end walls are arranged in oblique relation to said side walls.

2. In a cooking utensil of the character described comprising an open top pan of elongated extent, the side walls of said pan being of parallel disposition, while the end walls are arranged in oblique relation to said side walls, and in parallel relation to each other.

In testimony whereof I affix my signature.

JENNIE KONES.